United States Patent [19]
Rowland

[11] Patent Number: 5,018,825
[45] Date of Patent: May 28, 1991

[54] OVERHEAD OPTICAL TRANSMISSION SYSTEM

[75] Inventor: Simon M. Rowland, Tarporley, United Kingdom

[73] Assignee: BICC Public Limited Company, England

[21] Appl. No.: 532,551

[22] Filed: Jun. 4, 1990

[30] Foreign Application Priority Data

Jun. 14, 1989 [GB] United Kingdom ............... 8913710
Dec. 6, 1989 [GB] United Kingdom ............... 8927554
Dec. 6, 1989 [GB] United Kingdom ............... 8927555

[51] Int. Cl.$^5$ .................................................. G02B 6/44
[52] U.S. Cl. ............................... 350/96.23; 174/70 R
[58] Field of Search .................... 350/96.23; 174/70 R

[56] References Cited

U.S. PATENT DOCUMENTS

| | | | |
|---|---|---|---|
| 4,319,802 | 3/1982 | Bowes | 350/96.20 |
| 4,392,714 | 7/1983 | Brüggendieck et al. | 350/96.23 |
| 4,673,247 | 6/1987 | Oestreich | 350/96.23 |
| 4,674,832 | 6/1987 | Hirai et al. | 350/96.21 |
| 4,770,491 | 9/1988 | Champa et al. | 350/96.23 |
| 4,772,090 | 9/1988 | Atkins et al. | 350/96.23 |
| 4,776,665 | 10/1988 | Oestreich | 350/96.23 |

FOREIGN PATENT DOCUMENTS 0087891 9/1983 European Pat. Off. .
0137244 4/1985 European Pat. Off. .
2083647 3/1982 United Kingdom .
2132788 7/1984 United Kingdom .

Primary Examiner—John D. Lee
Attorney, Agent, or Firm—Anthony J. Casella; Gerald E. Hespos

[57] ABSTRACT

In an overhead optical transmission system in which an optical cable is freely supported between towers employed to support overhead electric power transmission lines and in which each end of the suspended length of optical cable is secured to a tower by means of a metal termination fitting which surrounds and is clamped on a part of a length of the optical cable at or near this end, each metal termination fitting of the cable over a part of the length of the fitting extending to the end of the fitting remote from the tower and an immediately adjacent part of the length of the optical cable are surrounded by a shield of an electrically conductive metal or of a semi-conductive plastics material sufficiently conductive to reduce arcing and/or joule heating. Preferably, a preformed helix constituting a damper extends lengthwise of the shield and may extend lengthwise of the part of the length of the fitting, the overall outer diameter of the preformed helix over a part of its length remove from the fitting increasing smoothly in a direction away from the fitting. Where the shield is a preformed helix of a semi-conductive plastics material, the preformed helix may be so shaped over a part of its length remote from the fitting that the preformed helix serves the dual purposes of a shield and a damper.

14 Claims, 2 Drawing Sheets

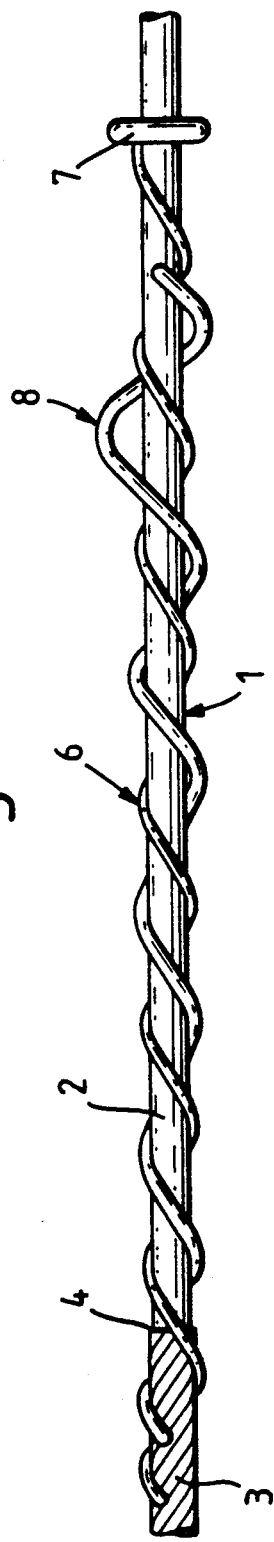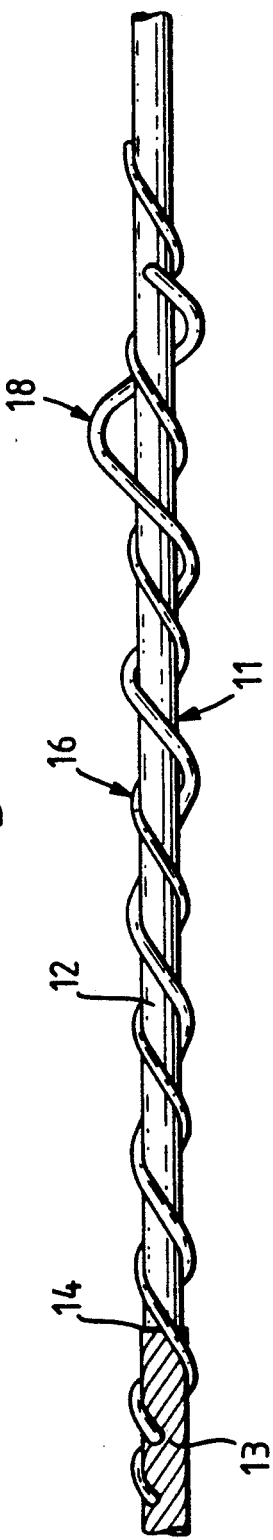

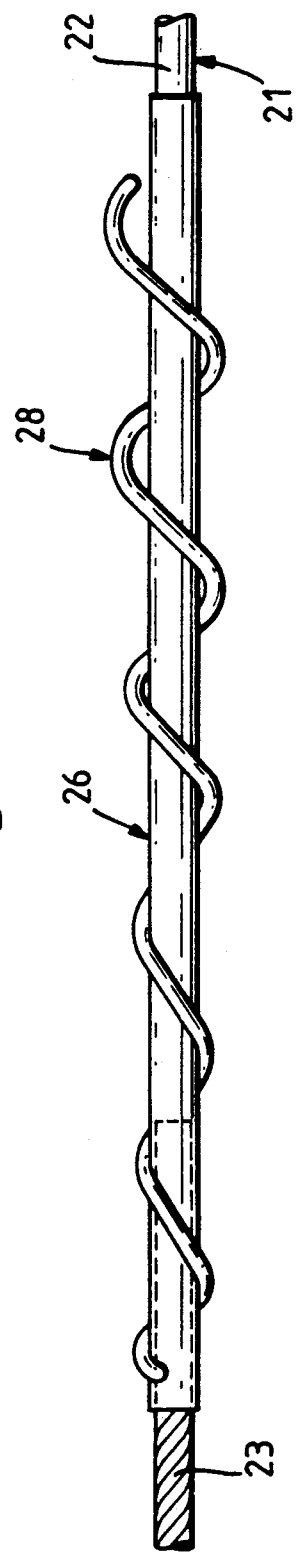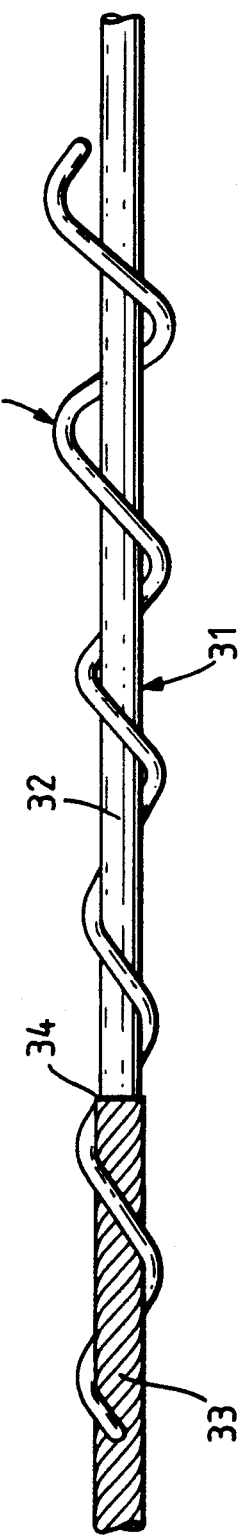

OVERHEAD OPTICAL TRANSMISSION SYSTEM

This invention relates to an overhead optical transmission system in which one or more than one optical cable comprising at least one optical fibre is freely supported in long lengths between towers, masts or other upstanding supports spaced along the route of the system, the or each optical fibre of the optical cable or cables being suitable for the transmission of light having a wavelength within the range 0.8 to 2.1 $\mu$m.

In an overhead optical transmission system of the aforesaid kind, it is the general practice to secure each end of the or each suspended long length of optical cable to a tower, mast or other upstanding support by means of a termination fitting of metal or metal alloy which surrounds and is clamped or otherwise secured on a part of the length of optical cable at or near said end. When an optical cable is supported in long lengths between spaced towers, masts or other upstanding supports employed to support overhead electric power transmission lines and the surface of the suspended optical cable is wet, dry band arcing arising from capacitively induced currents on the surface of the optical cable can cause degradation of the surface of the electrically insulating plastics sheath of the optical cable. The severity of such degradation is related to any mechanical stress to which the sheath of the suspended optical cable is subjected and stress on the cable sheath is at a maximum at or near the end of the metal termination fitting remote from the adjacent tower, mast or other upstanding support. As a consequence, unacceptable degradation of the optical cable sheath can occur at or near this end of each metal termination fitting on the cable.

It is an object of the present invention to provide an improved overhead optical transmission system in which risk of degradation of the plastics sheath of the or each optical cable in the region of said end of each metal termination fitting is substantially reduced.

According to the invention, in an overhead optical transmission system in which at least one optical cable is freely supported in long lengths between towers, masts or other upstanding supports employed to support overhead electric power transmission lines and spaced along the route of the system and in which each end of the suspended length of optical cable is secured to a tower, mast or other upstanding support by means of a termination fitting of metal or metal alloy which surrounds and is clamped or otherwise secured on a part of the length of the optical cable at or near said end, each metal termination fitting of the or each optical cable over a part of the length of the fitting extending to the end of the fitting remote from said tower, mast or other upstanding support and an immediately adjacent part of the length of the optical cable are surrounded by a circumferentially continuous or discontinuous shield of an electrically conductive metal or metal alloy or of a semi-conductive plastics material sufficiently conductive to prevent or substantially reduce arcing and/or joule heating.

Where the shield of each metal termination fitting and the immediately adjacent part of the length of the optical cable is circumferentially continuous, it may be a sleeve of an electrically conductive metal or metal alloy or of a semi-conductive plastics material, which sleeve may be preformed but preferably is a transversely folded strip of metal or metal alloy or of a semi-conductive plastics material.

Where the shield of each metal termination fitting and the immediately adjacent part of the length of the optical cable is circumferentially discontinuous, it may be a preformed helix of electrically conductive metal or metal alloy or of a semi-conductive plastics material The extreme end of the preformed helix remote from the termination fitting may be integral with or electrically connected to a body of such a shape as to provide stress relief. Alternatively, where the shield is circumferentially discontinuous, it may be a helical lapping of semi-conductive plastics tape.

In all cases, preferably the end faces of each shield are rounded to reduce risk of electric fields in these regions.

The electrically conductive metal or metal alloy of which each shield may be made preferably is aluminium or aluminium alloy or galvanised steel but it may be any other metal or metal alloy of high electrical conductivity. Where each shield is of a semi-conductive plastics material, preferably it is made of a polymeric material loaded with carbon black o other suitable electrically conductive filler.

With a view to reducing aeolion vibration which might otherwise occur in a length of suspended optical cable, it is the general practice to employ a damper near each end of the suspended cable. One such damper in general use is a preformed helix which is made of a rod of metal or metal alloy or of a rod of electrically insulating plastics material and whose overall outer diameter over a part of the length of the preformed helix remote from the metal termination fitting increases smoothly in a direction away from the fitting. When used, such a damper is so positioned that it surrounds a part of the length of a suspended optical cable immediately adjacent a termination fitting and usually extends over an adjacent part of the length of the termination fitting itself. Where in accordance with the present invention a termination fitting and the immediately adjacent part of the suspended optical cable are surrounded by a circumferentially continuous or discontinuous shield as hereinbefore described, preferably a preformed helix constituting a damper will be so positioned that it extends lengthwise of the shield and, also, may be so positioned that it extends lengthwise of a part of the length of the fitting extending to the end of the fitting remote from said tower, mast or other upstanding support. Preferably also, the damper will be of such a length as compared with that of the shield that the shield will extend beyond each end of the damper.

It is to be clearly understood that any other known form of damper for reducing aeolion vibration may be used in combination with a circumferentially continuous or discontinuous shield as hereinbefore described.

Where the shield is a preformed helix of a semi-conductive plastics material, the preformed helix may be so shaped over a part of its length remote from the termination fitting that the preformed helix serves the dual purposes of a shield and a damper.

The or each suspended optical cable of the improved overhead optical transmission system may have an overall sheath of a semi-conductive plastics material or of an anti-tracking material or it may have wholly or partially embedded within its sheath of electrically insulating material throughout its length at least one longitudinally continuous elongate element of electrically conductive or semi-conductive material. Where a suspended optical cable has an overall sheath of a semi-conductive plastics material or has wholly or partially embedded within the sheath throughout its length a longitudinally continuous elongate element of electrically conductive or semi-conductive material, mechanical stress on the cable sheath at or near the end of the metal termination fitting may locally decrease the electrical conductivity of the sheath. The circumferentially continuous or discontinuous shield has the additional advantage that, in such circumstances, it will electrically short the sheath in the vicinity of the metal termination fitting and thereby substantially reduce risk of anomalous joule heating.

BRIEF DESCRIPTION OF DRAWINGS

The invention will be further illustrated by a description, by way of example, of four preferred arrangements for reducing risk of degradation of the plastics sheath of an optical cable of an overhead optical transmission system in the region of a metal termination fitting by which an end of the suspended optical cable is secured to a tower, mast or other upstanding support of an overhead electric power transmission line, with reference to FIGS. 1 to 4 of the accompanying drawings which, respectively, illustrate a side view of one of the four preferred arrangements.

DETAILED DESCRIPTION

In the first preferred arrangement shown in FIG. 1, one end of the optical cable 1, which has a plastics sheath 2, is secured to a tower (not shown) of an overhead electric power transmission line by a metal termination fitting 3 which surrounds and is clamped on a part of the length of the optical cable near this end. A part of the length of the metal termination fitting 3 extending to the end 4 of the fitting remote from the tower (not shown) and an immediately adjacent part of the length of the optical cable 1 are surrounded by a circumferentially discontinuous shield 6 constituted by a preformed helix of aluminium rod which grips those parts of the fitting and optical cable which it surrounds throughout its length. The extreme end of the preformed helix 6 remote from the metal termination fitting 3 is integral with a body 7 shaped to provide stress relief. End faces of the preformed helix 6 are rounded to reduce risk of electric fields in these regions. Extending over a major part of the length of the circumferentially discontinuous shield constituted by the preformed helix 6 intermediate of its ends is a damper 8 for reducing aeolian vibration which might otherwise occur in the suspended optical cable. The damper 8 is constituted by a preformed helix made of a rod of electrically conductive metal or metal alloy or of a rod of electrically insulating material which, as will be seen on referring to FIG. 1, at one end part of its length overlies a part of the length of the metal termination fitting 3 and, over another part of its length extending to the end of the helix remote from the metal termination fitting 3 has an overall diameter which increases smoothly towards this end so that the distance between the optical cable 1 and the turns of the helix over this part of the length of the damper increases smoothly in a direction away from the metal termination fitting.

For convenience, component parts of the three arrangements illustrated in FIGS. 2, 3 and 4 corresponding to component parts of the arrangement illustrated in FIG. 1 are given numerical references greater by ten than the corresponding components in the preceding FIG.

Thus, in the second preferred arrangement shown in FIG. 2, the circumferentially discontinuous shield 16 overlying adjacent parts of the lengths of the metal termination fitting 13 and of the optical cable 11 is constituted by a preformed helix made of a rod of semi-conductive plastics material which grips those parts of the fitting and the optical cable which it surrounds throughout its length.

In the third preferred arrangement shown in FIG. 3, a circumferentially continuous shield 26 surrounds adjacent parts of the metal termination fitting 23 and the optical cable 21 and is constituted by a sleeve formed by a transversely folded aluminium strip. As in each of FIGS. 1 and 2, the damper 28 is constituted by a preformed helix made of a rod of electrically conductive metal or metal alloy or made of a rod of electrically insulating material.

Referring to FIG. 4, as in the arrangements illustrated in FIGS. 1 and 2, a circumferentially discontinuous shield 36 overlying adjacent parts of the metal termination fitting 33 and of the optical cable 31 is constituted by a preformed helix but, in this case, the preformed helix is made of a rod of semi-conductive plastics material and, over a part of its length extending to the end of the preformed helix remote from the metal termination fitting the overall diameter of the preformed helix increases smoothly towards this end so that the distance between the optical cable and the turns of the preformed helix over this part of the length of the preformed helix increases smoothly in a direction away from the metal termination fitting so that the preformed helix serves the dual purposes of a circumferentially discontinuous shield and a damper.

It will be appreciated that in an improved overhead optical transmission system in accordance with the invention, risk of degradation of the plastics sheath of the or each optical cable in the region of the end of each metal termination fitting remote from the tower, mast or other upstanding support to which the fitting is secured can be substantially reduced by employing any one of the four preferred arrangements illustrated in and described with reference to FIGS. 1 to 4 of the accompanying drawings.

What I claim as my invention is:

1. In an overhead optical transmission system in which at least one optical cable having a sheath of electrically insulating material is freely supported in long lengths between upstanding supports employed to support overhead electric power transmission lines and spaced along the route of the system and in which each end of the suspended length of optical cable is secured to an upstanding support by means of a termination fitting of metal or metal alloy which surrounds and is secured on a part of the length of the optical cable at said end, each metal termination fitting of the optical cable over a part of the length of the fitting extending to the end of the fitting remote from said upstanding support and an immediately adjacent part of the length of the optical cable are surrounded by a shield of a material sufficiently electrically conductive at least to substantially reduce arcing and joule heating.

2. An overhead optical transmission system as claimed in claim 1, wherein the shield surrounding said part of the length of the metal termination fitting and said immediately adjacent part of the length of the optical cable is a circumferentially continuous sleeve.

3. An overhead optical transmission system as claimed in claim 2, wherein the circumferentially continuous sleeve constituting the shield is a transversely folded strip of said electrically conductive material.

4. An overhead optical transmission system as claimed in claim 1, wherein the shield is a preformed helix of said electrically conductive material surrounding said part of the length of the metal termination fitting and said immediately adjacent part of the length of the optical cable.

5. An overhead optical transmission system as claimed in claim 4, wherein the extreme end of the preformed helix constituting the shield remote from the metal termination fitting is in electrical contact with a body of such a shape as to provide stress relief.

6. An overhead optical transmission system as claimed in claim 1, wherein the shield is a helical lapping of semi-conductive plastics tape surrounding said part of the length of the metal termination fitting and said immediately adjacent part of the length of the optical cable.

7. An overhead optical transmission system as claimed in claim 1, wherein the shield is a preformed helix of a semi-conductive plastics material whose overall outer diameter over a part of the length of the preformed helix remote from the metal termination fitting increases smoothly in a direction away from the fitting so that the preformed helix serves the additional purpose of a damper.

8. An overhead optical transmission system as claimed in claim 1, wherein the or each suspended optical cable of the system has an overall sheath of a semi-conductive plastics material or of an anti-tracking material.

9. An overhead optical transmission system as claimed in claim 1, wherein said optical cable has at least partially embedded within its sheath of electrically insulating material throughout its length at least one longitudinally continuous elongate element of electrically conductive or semi-conductive material.

10. An overhead optical transmission system in which at least one optical cable having a sheath of electrically insulating material is freely supported in long lengths between upstanding supports employed to support overhead electric power transmission lines and spaced along the route of the system and in which each end of the suspended length of optical cable is secured to an upstanding support by means of a termination fitting of metal or metal alloy which surrounds and is secured on a part of the length of the optical cable at said end, each metal termination fitting of the optical cable over a part of the length of the fitting extending to the end of the fitting remote from said upstanding support and an immediately adjacent part of the length of the optical cable are surrounded by a circumferentially shield of a material sufficiently electrically conductive at least to substantially reduce arcing and joule heating and a preformed helix constituting a damper extends lengthwise of the shield, the overall outer diameter of the preformed helix over a part of its length remote from the fitting increasing smoothly in a direction away from the fitting.

11. An overhead optical transmission system as claimed in claim 10, wherein the preformed helix constituting a damper extends also over said part of the length of the metal termination fitting extending to the end of the fitting remote from said upstanding support.

12. An overhead optical transmission system as claimed in claim 11, wherein the preformed helix constituting the damper is of such a length as compared with that of the shield that the shield extends beyond each end of the damper.

13. An overhead optical transmission system as claimed in claim 10, wherein the preformed helix constituting the damper is of such a length as compared with that of the shield that the shield extends beyond each end of the damper.

14. Ann overhead optical transmission system as claimed in claim 10, wherein the suspended optical cable of the system has an overall sheath of a semi-conductive plastics material or of an anti-tracking material.

* * * * *